July 5, 1966 W. E. BUCK 3,259,008
OSCILLOSCOPE TRACE COPY ATTACHMENT
Filed May 27, 1963
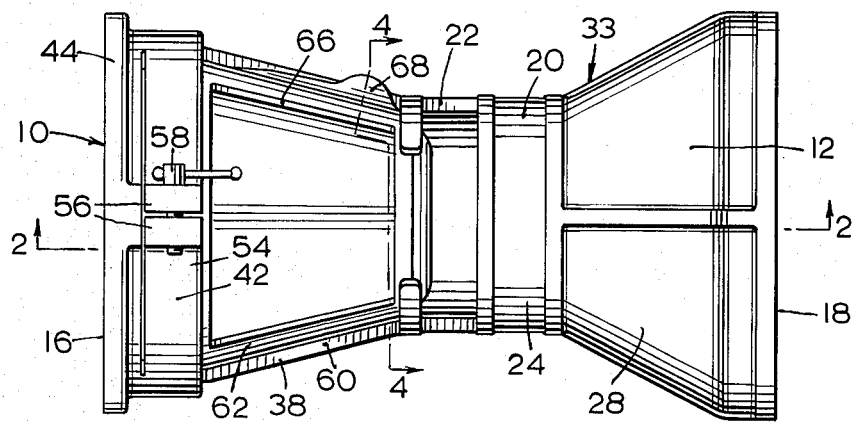
FIG. 1.
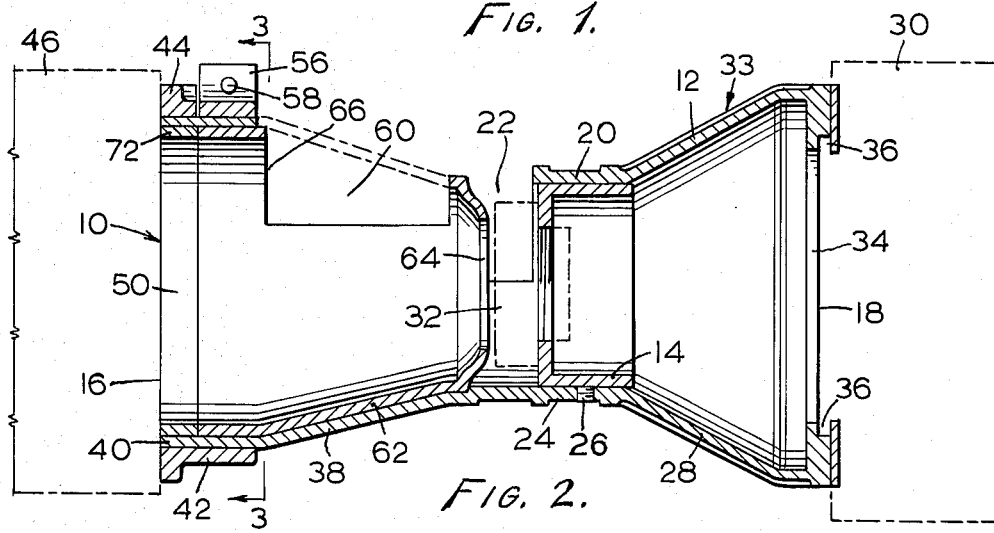
FIG. 2.
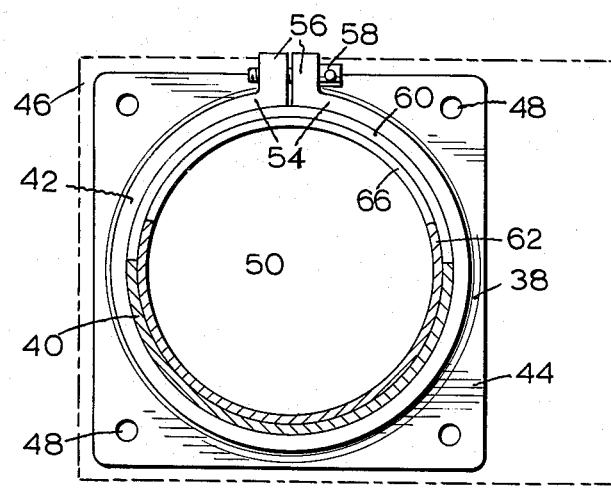
FIG. 3.
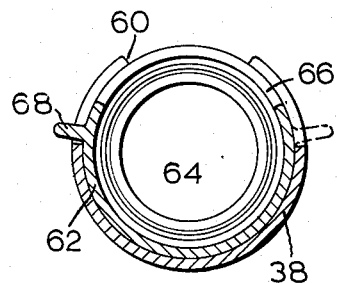
FIG. 4.
INVENTOR.
WILLARD E. BUCK
BY
ATTORNEYS

United States Patent Office 3,259,008
Patented July 5, 1966

3,259,008
OSCILLOSCOPE TRACE COPY ATTACHMENT
Willard E. Buck, P.O. Box 418, Saratoga, Calif.
Filed May 27, 1963, Ser. No. 283,362
8 Claims. (Cl. 88—24)

This invention relates to photographic copy attachments and, more specifically, to a copying shield for use with "Polaroid Land Cameras" to record oscilloscope traces.

One of the most widely used electronic test instruments is the oscilloscope and occasions frequently arise wherein it becomes desirable to record the scope trace in some permanent form. The obvious answer to this need is, of course, to reproduce the data photographically.

Prior to the advent of so-called "10 second photography" as exemplified by Dr. Land's "Polaroid" cameras and films, however, such a permanent record was not immediately available because the film had to be removed from the camera, developed and printed, a process which ordinarily involves an hour or more to accomplish. Due to the efforts and discoveries of the Polaroid Corporation, it is now possible to have almost immediate access to a permanent photographic reproduction of the scope trace and this is an extremely valuable aid to the researcher who has occasion to record shortlived data that may be difficult to produce more than once.

There remain, however, a number of problems in connection with photographic reproduction of scope trace patterns that are not solved by the ten-second developing and printing techniques as exemplified in the "Polaroid" system. Among these are the exclusion of extraneous light falling on the cathode ray tube of the scope; the control of image size; mounting of the "Polaroid" magazine in fixed spaced parallel relation to the face of the scope tube so as to eliminate framing and focusing operations that would otherwise interfere with the primary task at hand, namely, the production of the trace to be photographed; and, probably most important, the provision for visual monitoring of the scope image up until the instant of exposure.

It has now been found in accordance with the teaching of the instant invention that these and other problems can be solved adequately and inexpensively through the use of a unique scope trace copy attachment. In general, the unit consists of a cast metal housing open at both ends that will receive and hold one of the 4 x 5 "Graphic Polaroid Backs" in fixed spaced parallel relation to the exposed face of an oscilloscope tube on which the trace to be photographed will appear. The open end opposite the film plane is equipped with an interchangeable mounting flange attachable to various oscilloscopes in position to encircle and shield the tube. The Polaroid Land Camera and lens are not used but only the back adapted to accept Polaroid 4 x 5 roll film that is manufactured especially for use on "Grafic," "Linhof" and similar cameras equipped to accept same. The lens is mounted in an axially-adjustable lens holder located in a tubular section intermediate of the ends which is open on top to provide access to the lens settings. The axial adjustment of the lens provides means for changing the size of the reproduced image relative to the fixed film size.

The portion of the housing behind the lens is light-tight and substitutes for the camera box. The housing portion in front of the lens on the other hand, is equipped with a novel sliding door arrangement which, when open, enables the user to keep the scope in full view until immediately before exposure when the door is closed to exclude extraneous light. All bellows units and complicated lens adjustment mechanisms are eliminated in favor of the simple cast metal body.

It is, therefore, the principal object of the present invention to provide a novel and improved oscilloscope trace copying attachment ideally suited for use with "Polaroid" sensitized materials and film holders.

A second object is the provision of a copy attachment that provides an extremely simple adjustable lens holder for varying image magnification.

Another object of the invention herein claimed is to provide means for photographically reproducing a scope trace that makes provision for keeping the trace in full view of the operator until immediately prior to exposure.

Still another objective is the provision of a scope trace copy attachment that shields all extraneous light from the face of the tube during exposure.

An additional object of the invention is to produce a copy attachment for oscilloscopes and the like wherein the lens remains accessible for diaphragm adjustments, exposure settings and actuation without the necessity for complex remote firing devices.

Further objects are the provision of a unit of the type above-mentioned which is simple, inexpensive, rugged, accurate, easy to use, versatile and even decorative in appearance.

Other objects will be in part apparent and in part pointed out specifically hereinafter in connection with the description of the drawing that follows, and in which:

FIGURE 1 is a top plan view of the copy attachment showing the sliding gate or door in the housing fully open;

FIGURE 2 is a section taken along line 2—2 of FIGURE 1 with the lens, "Polaroid" back and scope indicated in dotted lines;

FIGURE 3 is a section taken along line 3—3 of FIGURE 2; and,

FIGURE 4 is a section taken along line 4—4 of FIGURE 1.

Referring now to the drawings for a detailed description of the present invention and, initially, to FIGURES 1 and 2 for this purpose, the scope trace copy attachment that has been designated in a general way by reference numeral 10 will be seen to comprise a hollow cast metal body 12 having an axially adjustable lens mount 14 intermediate to the front and rear open ends 16 and 18, respectively, thereof. Intermediate to the front and rear open ends of the body 12 is located a tubular cylindrical section 20, the top half of which is cut away at the forward end to produce an arcuate slot 22 opening onto the lens. The rear portion 24 of tubular section 20 constitutes a complete ring which provides continuous annular support for the cup-shaped cylindrical lens mount or holder 14 that can slide axially back and forth therein and is secured in adjusted position by set-screw 26.

The portion 28 of the body 12 that lies behind the tubular section 20 flares rearwardly and, while hollow, constitutes a light-tight box when the rear open end 18 thereof is covered with the removable "Graphic Polaroid Back" that is available through Graflex, Inc. and which has been indicated in dotted lines in FIGURE 2 carrying reference numeral 30. Thus, with the lens 32 (dotted lines in FIGURE 2) screwed in place into the lens mount 14 and the back 30 attached to the rear end of the body, these elements cooperate to define a complete camera which, for purposes of the present description, has been broadly designated by reference numeral 33.

The light-tight box or enclosure 28 of the camera portion 28, as aforementioned, flares rearwardly from the tubular section 20 and, in the particular form shown, changes shape to that of a truncated four-sided prism that surrounds a generally rectangular opening 34 which forms the mask for the film. The rear face of the body 12 is provided with opposed grooves 36 along the top and bottom as well as one side (not shown) into which the "Graphic Polaroid Back" 30 fits. Loading the camera with "Polaroid Land Type 410" film which presently has an A.S.A. speed index of 3,000 enables the trace to be photographed at instantaneous speeds without supplementary illumination. The finished print is available in ten seconds and the results can be checked so that additional shots may be taken while the experiment or test is still in progress if the results are unsatisfactory.

An ordinary camera lens 32 completes the camera section of the attachment. As with most copy attachments, the lens is either of the fixed focal length type or is used at a fixed focal length, generally its maximum one, corresponding to a setting of infinity" on the focusing ring. This is done because with the film plane and subject separated a fixed distance, shifting the lens to-and-fro axially by means of the adjustable lens mount merely changes the ratio between the size of the image recorded on the film and the actual size of the subject.

Next, with reference to all four figures of the drawing, it will be seen that the forward portion of the body 12 which has been broadly designated by reference numeral 38, constitutes a lens hood that also supports the camera in fixed spaced relation to the subject. This hood-forming section 38 flares forwardly from the intermediate tubular section 20 that houses the lens and is generally frusto-conical in shape except for a short cylindrical section 40 at its forward extremity. This cylindrical section 40 fits inside of a split-ring type mount 42.

The mount 42 includes a generally rectangular face plate 44 adapted to fit over or replace the mask (not shown) that customarily surrounds the cathode ray tube of an oscilloscope which has been shown in dotted lines in FIGURE 2 and given reference numeral 46. The apertures 48 at the corners of the face plate are located to register with the corresponding openings in the scope tube mask so that mount 42 can be attached directly to the case.

Face plate 44 has a central opening 50 therein of a size and shape corresponding to that of the tube mask. This opening is bordered by an integrally-formed split-ring 42 whose adjacent free ends 54 are provided with upturned ears 56 that are interconnected across the gap therebetween by a tightening screw 58. Thus, the cylindrical section 40 of the hood portion 38 can be inserted into the mount with the split-ring connector 42 loosened; whereupon, tightening of the screw 58 will clamp the entire attachment securely to the face of the scope.

Now, perhaps the single most important feature of the present invention is the door in the hood portion through which the scope trace can be observed up until the moment immediately prior to exposure. The conical surface of the hood-forming portion is provided with a rather large opening 60 that, in the particular form shown, encompasses approximately one-half of the total conical surface and is located in the top. When this opening is uncovered, the operator has a clear view therethrough of the trace on the scope which is to be photographed.

Inside of this hood-forming portion 38 of the body 12 is located a similarly shaped rotatable door-forming element 62. This door is slidably mounted inside the conical section of the housing for rotatable movement about their common longitudinal axis. The rear end of the door has an opening 64 through which the lens 32 projects and is loosely received. The door also includes an opening 66 that in the open position thereof registers with the corresponding opening 60 in the hood-forming portion of the body. Openings 66 and 60 are substantially the same size measured from front to rear although the door opening is somewhat narrower to accommodate stop-forming fingerhold 68. Thus, when the fingerhold is rotated to the left as viewed in FIGURE 4 until it engages the edge of the hood portion bordering opening 60, the operator has a clear view of the scope tube.

This conical door 62 is slightly shorter than the hood-forming section 38 of the body 12 in order to accommodate retaining ring 72 which slips into the cylindrical section 40 and holds the door in place. This ring can be secured to the body or merely held in place with a friction fit.

The door, when closed as shown in FIGURE 1 and dotted lines in FIGURE 4, effectively blocks out extraneous light and enables the high-speed film to record the rather dim trace image. It is significant to note that no light can reach the film except when the lens shutter is open even though door 62 is open.

The prior art attachments for this purpose made no provision for direct actuation of the shutter, but rather, accomplished this function remotely through the use of cable releases and similar remote firing mechanisms. Also, diaphragm settings were difficult to accomplish due to the inaccessibility of the lens. Here, however, as can be seen in FIGURES 1, 2 and 4, the intermediate tubular section 20 provides the arcuate slot 22 extending approximately half way around the front end thereof on top. The diaphragm adjustment ring of most lenses together with the shutter tripping lever, neither of which have been specifically shown, are customarily located on the lens barrel in position to be accessible through slot 22. This means, of course, that the diaphragm can be set and the shutter fired directly with the sliding gate closed to eliminate extraneous light. The forward extremity of the lens 32 is close enough to the opening 64 in the rear end of the gate even with the lens mount 14 in its rear-most position to effectively block out any extraneous light entering the front end of the housing through slot 22.

Having thus described the several useful and novel features of the scope trace copy attachment of the present invention, it will be apparent that the many worthwhile objectives for which it was developed have been achieved. Although but a single specific embodiment of the invention has been illustrated and described herein, I realize that certain changes and modifications may well occur to those skilled in the art within the broad teaching hereof; hence, it is my intention that the scope of protection afforded hereby shall be limited only in so far as said limitations are expressly set forth in the appended claims.

What is claimed is:

1. An attachment for use with a lens and a film back containing a high-speed self-processing emulsion to form a copy camera adapted to photographically reproduce oscilloscope traces which comprises: a housing open at both ends having an intermediate tubular section adapted to receive a camera lens that separates a light-tight portion that form the camera body from a lens-shading portion that has a viewing port in the wall thereof, the openings at the ends of said housing lying in spaced parallel relation to one another normal to the axis of the tubular section, the rear end opening cooperating with the body portion to define a mask framing the film with a film back in place thereon, and said front opening being of a size and shape adapted to encircle the face of an oscilloscope tube upon which the trace to be photographed appears; means carried by the rear of the camera-body portion of the housing bordering the opening therein adapted to receive a film back of the type used with self-processing films of light-tight relation; means carried by the lens-shading portion of the housing bordering the front opening therein adapted for attachment to the face of an oscilloscope in position such that the trace is visible through the viewing port in the wall; means for mounting a camera lens within the tubular section of the housing in light-tight relation to the camera-body portion including a tubular lens mount attached within said tubular housing section for axially adjustable movement with respect to the actual image; and, gate-means carried by the lens-shading portion of the housing for movement from an open position uncovering the viewing port into a closed position covering the latter which substantially excludes extraneous light.

2. The copy attachment as set forth in claim 1 in which, the lens-shading portion of the housing is frusto-conical and flares forwardly from the tubular section.

3. The copy attachment as set forth in claim 1 in which, the opening in the body-forming portion of the housing is rectangular, the front opening in the shade-forming portion is circular, and the centers of both of said rectangular and circular openings lie on the axis of the tubular section.

4. The copy attachment as set forth in claim 1 in which, the forward extremity of the shade-forming portion terminates in a cylindrical rim, and the means for attaching the housing to the oscilloscope face includes a ring clamp encircling said cylindrical rim.

5. The copy attachment as set forth in claim 1 in which the shade-forming portion of the housing is frusto-conical with its axis coincident with the axis of the tubular section, and in which the gate means comprises a frusto-conical element sized to fit inside the shade-forming portion of the housing for rotational movement relative thereto about a common axis, said frusto-conical element having an opening in the wall thereof adapted to register with the viewing port in open position and cover same in closed position.

6. The copy attachment as set forth in claim 1 in which the viewing port in the wall of the shade-forming portion adjoins the tubular section and is adapted to provide access to a camera lens mounted therein for the purpose of accomplishing diaphragm and shutter settings.

7. The copy attachment as set forth in claim 1 in which the tubular section of the housing includes an opening providing access to a lens mounted therein for the purpose of accomplishing actuation thereof exteriorly, said opening being located so as to prevent light from entering the camera-body portion of the housing.

8. The copy attachment as set forth in claim 4 in which the means for attaching the housing to the oscilloscope face includes a face plate bordering the ring clamp and adapted to cooperate therewith in forming a mask to replace the tube mask of the oscilloscope.

References Cited by the Examiner

UNITED STATES PATENTS

| | | | |
|---|---|---|---|
| 2,751,275 | 6/1956 | Mansberg | 346—110 |
| 2,984,537 | 5/1961 | Jarvis et al. | 346—110 |
| 3,149,903 | 9/1964 | Merrick | 88—24 X |

NORTON ANSHER, *Primary Examiner.*

R. A. WINTERCORN, *Assistant Examiner.*